US008381099B2

(12) United States Patent
Giannetti (10) Patent No.: US 8,381,099 B2
(45) Date of Patent: Feb. 19, 2013

(54) FLOWS FOR VARIABLE-DATA PRINTING

(75) Inventor: Fabio Giannetti, Stoke Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1666 days.

(21) Appl. No.: 11/494,182

(22) Filed: Jul. 26, 2006

(65) Prior Publication Data

US 2007/0055690 A1 Mar. 8, 2007

(30) Foreign Application Priority Data

Sep. 8, 2005 (GB) .................................. 0518262.1

(51) Int. Cl.
*G06F 17/00* (2006.01)

(52) U.S. Cl. ........ 715/253; 715/234; 715/243; 715/244; 715/246; 715/247

(58) Field of Classification Search .......... 715/209–210, 715/243–253
See application file for complete search history.

(56) References Cited

U.S. PATENT DOCUMENTS

| | | | | |
|---|---|---|---|---|
| 5,845,303 A * | 12/1998 | Templeman | .................. | 715/255 |
| 5,878,421 A * | 3/1999 | Ferrel et al. | ............................. | 1/1 |
| 6,161,114 A * | 12/2000 | King et al. | ..................... | 715/202 |
| 6,199,082 B1 * | 3/2001 | Ferrel et al. | ..................... | 715/205 |
| 6,665,586 B1 * | 12/2003 | Ball et al. | ....................... | 700/226 |
| 7,025,268 B2 * | 4/2006 | Alleshouse | .............. | 235/462.01 |
| 7,200,816 B2 * | 4/2007 | Falk et al. | ..................... | 715/762 |
| 7,278,094 B1 * | 10/2007 | Dreyer et al. | ................. | 715/234 |
| 7,302,438 B1 * | 11/2007 | Gauthier et al. | ....................... | 1/1 |
| 7,315,979 B1 * | 1/2008 | Walker | ........................... | 715/234 |
| 7,370,274 B1 * | 5/2008 | Stuple et al. | ................... | 715/255 |
| 7,380,202 B1 * | 5/2008 | Lindhorst et al. | ............. | 715/204 |
| 7,407,102 B2 * | 8/2008 | Alleshouse | .............. | 235/462.01 |
| 7,412,647 B2 * | 8/2008 | Sellers et al. | .................. | 715/253 |
| 7,548,334 B2 * | 6/2009 | Lo et al. | ........................ | 358/1.15 |
| 7,554,689 B2 * | 6/2009 | Tonisson | ....................... | 358/1.18 |
| 7,634,725 B2 * | 12/2009 | Nishikawa | .................... | 715/243 |
| 7,707,495 B2 * | 4/2010 | Hosotsubo | .................... | 715/243 |
| 7,735,004 B2 * | 6/2010 | Kobashi et al. | ............... | 715/243 |
| 7,805,672 B2 * | 9/2010 | Kobashi | ........................ | 715/252 |
| 7,861,160 B2 * | 12/2010 | Ohno | ............................ | 715/244 |
| 8,095,872 B2 * | 1/2012 | Sellers et al. | .................. | 715/251 |
| 2003/0159114 A1 * | 8/2003 | Nishikawa et al. | ........... | 715/530 |
| 2003/0189726 A1 * | 10/2003 | Kloosterman et al. | ....... | 358/1.18 |
| 2004/0094632 A1 * | 5/2004 | Alleshouse | ................... | 235/494 |
| 2004/0205568 A1 * | 10/2004 | Breuel et al. | .................. | 715/513 |

(Continued)

FOREIGN PATENT DOCUMENTS

GB 2 282 100 A 3/1995

OTHER PUBLICATIONS

Templating Specification Version 1.0—Dec. 12, 2002 the PPML Working Group PODi; PPMLTemplate_v1[1][1].0_2002-12-12.pdf.*

*Primary Examiner* — Doug Hutton, Jr.
*Assistant Examiner* — Benjamin Smith (57) ABSTRACT

A method, system and a computer program product for generating and printing documents 100, 110, 120 from a variable-data printing document template 130 comprising a layout of document portions 150, at least one of the document portions 150 comprising a flow that contains content which is variable in response to input data 140. There is provided a way of expressing and treating a flow across copy-holes (document portions comprising variable content) in different pages, thus enabling the creation of complex document designs for variable-data publishing material used in Digital Publishing.

18 Claims, 5 Drawing Sheets

U.S. PATENT DOCUMENTS

| | | |
|---|---|---|
| 2005/0094205 A1* | 5/2005 | Lo et al. ................... 358/1.18 |
| 2005/0094206 A1* | 5/2005 | Tonisson ................... 358/1.18 |
| 2005/0094207 A1* | 5/2005 | Lo et al. ................... 358/1.18 |
| 2005/0105129 A1* | 5/2005 | Takahashi ................. 358/1.15 |
| 2005/0168782 A1* | 8/2005 | Kobashi et al. .......... 358/1.18 |
| 2005/0172221 A1* | 8/2005 | Kobashi et al. ............ 715/513 |
| 2005/0172226 A1* | 8/2005 | Kobashi et al. ............ 715/518 |
| 2005/0283722 A1* | 12/2005 | Warmus et al. ............ 715/525 |
| 2006/0028659 A1* | 2/2006 | Nishikawa ................. 358/1.2 |
| 2006/0031762 A1* | 2/2006 | Takashima ................ 715/517 |
| 2006/0066905 A1* | 3/2006 | Takashima et al. ....... 358/1.18 |
| 2006/0071915 A1* | 4/2006 | Rehm ....................... 345/173 |
| 2006/0138227 A1* | 6/2006 | Alleshouse ................ 235/432 |
| 2006/0152748 A1* | 7/2006 | McCarthy et al. ........ 358/1.13 |
| 2006/0155699 A1* | 7/2006 | Purvis et al. .................. 707/6 |
| 2006/0156227 A1* | 7/2006 | Hosotsubo ................. 715/517 |
| 2006/0190811 A1* | 8/2006 | Ohno ........................ 715/507 |
| 2006/0193008 A1* | 8/2006 | Osaka et al. .............. 358/1.18 |
| 2006/0200752 A1* | 9/2006 | Sellers et al. ............. 715/503 |
| 2006/0248454 A1* | 11/2006 | Giannetti ................... 715/517 |
| 2007/0002377 A1* | 1/2007 | Tokunaga ................. 358/1.18 |
| 2007/0089053 A1* | 4/2007 | Uhlig et al. ................ 715/513 |
| 2010/0088592 A1* | 4/2010 | Hosotsubo ................. 715/255 |

* cited by examiner

FLOWS FOR VARIABLE-DATA PRINTING

FIELD OF THE INVENTION

This invention relates to a method, system and a computer program product for generating and printing a document, and to a variable-data printing document template which defines multiple document versions, each document version being selectable in response to input data.

RELATED ART

The advent of digital technology means there are now more ways than ever to communicate. This increased ability to send and receive data significantly expands an organisation's ability to deliver information via the Internet and advanced printing and publishing systems.

The combination of Web technologies and digital printing can reduce communication costs, help businesses acquire new customers, increase the loyalty and buying habits of current customers, enable new revenue opportunities, and give birth to new business models.

By gathering the right data and utilizing digital publishing an organization can deliver information customized to their customer's wishes, when they need it. Consequently, it is no surprise that personalized, highly targeted collateral and direct marketing are widely accepted as key factors in achieving higher response rates, increased efficiencies, and improved marketing.

Digital publishing solutions enable real-time targeted marketing (RTTM) by enabling the ability to create, print on demand, and distribute marketing collateral such as brochures, presentations, direct mail and point of sale materials that are customized to each audience member in a cost effective manner. However, the value of RTTM extends beyond improved marketing response rates by helping reduce costs and drive incremental revenue.

Variable-data printing (VDP) is a form of on-demand printing in which all the documents in a print run are similar but not identical. A mail merge is a simple form of VDP. For example, personalized letters may have the same basic layout, but there will be a different name and address on each letter.

Variable-data printing can now go far beyond printing different names and addresses on a document. There are systems that enable the user to insert different graphics into a document, change the layout and/or the number of pages, print a unique bar code on each document and more.

A prominent example of VDP usage is how credit-card companies analyze the buying histories of their customers and send information about specific products and services related to the ascertained customer interests. VDP systems are used to print these customized advertisements.

The concept of creating variable-data documents has also been extended to non-paper documents such as PDF documents and HTML documents. The term variable-data publishing (VDP) encompasses both paper documents and on-line documents.

A number of different technologies and formats have emerged which assist in the implementation of VDP systems, and these are discussed briefly below.

Scalable Vector Graphic (SVG) is a new graphics file format and Web development language based on Extensible Markup Language (XML). SVG enables designers to create dynamically generated, high-quality graphics from real-time data with precise structural and visual control. With this technology, SVG developers can create applications and documents based on data-driven, interactive, and personalized graphics.

Extensible Markup Language (XML) is a markup language much like HyperText Markup Language (HTML). XML and HTML were designed with different goals. XML was created to structure, store and to send information. Since XML is a cross-platform, software and hardware independent tool for transmitting information, XML data can be exchanged between incompatible systems. In practice, computer systems and databases may contain data in incompatible formats. Converting the data to XML creates data that can be read by many different types of applications, and this greatly reduces this complexity of exchanging data between systems.

Due to the resultant demands for the layout, content and personalization of documents, high-volume print jobs are becoming more complex. In addition to this, pressure on the operators at the machines is increasing.

Personalized Print Markup Language (PPML) is the print industry's answer to these issues. PPML is a new, XML-based, industry standard print language for VDP. It enables high-speed, efficient printing and production of documents with reusable and variable content.

Extensible Stylesheet Language Formatting Objects (XSL-FO) is an XML based markup language describing the formatting of XML data for output to screen, paper or other media.

The above developments have enabled the production of increasingly sophisticated VDP material for Digital Publishing. Production of such material relies upon the creation of complex document designs that have sections with variable content known as flows. This variable content is, for example, to be obtained from a database, and may occupy a variable size as well as having variable content. The physical location of a document set aside for such a flow (of variable data) is often termed a 'copy-hole'.

In Variable Data Printing (VDP) there is a need to generate templates that have enough flexibility to accommodate different variants.

Currently, the Graphic Artist (GA) has the possibility of expressing, within the design, the option of non-existence for variants such as copy-holes or pages.

However, when variable content spans across multiple variants, the option of non-existence of one of the variants raises the problem of ensuring that the variable content is not invalidated when one or more of the variants are not present.

Existing authoring tools have an automatic way of dealing with flows across variants by incorporating the content of the flow when the document layout is being designed. For example, if the GA creates a flow across copy-holes in different pages (commonly referred to as linked copy-holes), the authoring tool automatically eliminates the relevant copy-holes from the list of linked copy-holes when a page is removed at design time. The authoring tool then re-renders the content of the flow and updates the document layout. This intuitive approach is supported by many existing authoring tools. However, the existing approach renders the content of the flow during the design process, thus defining a final document before it is exported. Consequently, application of existing design tools in conjunction with variable data merging is not possible.

SUMMARY OF THE INVENTION

According to an aspect of the invention, there is provided a method of generating a variable-data printing document template in a computer readable format, the template defining multiple document versions, with each document version being selectable in response to input selection data, the method comprising:

defining a template comprising a layout of document portions, at least one set of the document portions comprising a flow that contains content which is variable in response to input data, the flow spanning across the set of document portions; and     defining a plurality of document versions, different document versions comprising different combinations of document portions of the set, and indicating the desired variable content of the flow,     wherein the continuity of the flow is maintained when a version is selected in response to input selection data.

According to another aspect of the invention, there is provided a method of generating a document for printing, the document comprising one version of a variable-data printing document template which defines multiple document versions and in which each document version is selectable in response to input selection data, the method comprising:

generating the document template, by:

defining a template comprising a layout of document portions, at least one set of the document portions comprising a flow that contains content which is variable in response to input data, the flow spanning across the set of document portions; and         defining a plurality of document versions, different document versions comprising different combinations of document portions of the set, and indicating the desired variable content of the flow; and     generating a document for printing by providing input selection data to the template, wherein the continuity of the flow is maintained when a version is selected in response to input selection data.

According to yet another aspect of the invention, there is provided a system for generating a variable-data printing document template, the template defining multiple document versions, with each document version being selectable in response to input selection data, the system comprising:

a processor which is adapted to:

receive from a user a template definition comprising a layout of document portions, at least one set of the document portions comprising a flow that contains content which is variable in response to the input data, the flow spanning across the set of document portions, and the continuity of the flow being maintained when a version is selected in response to input selection data;

receive from a user a plurality of document versions, different document versions comprising different combinations of document portions of the set, and indicating the desired variable content of the flow; and         provide to a printer the document template.

According to a further aspect of the invention, there is provided a computer program for implementing a method of generating a variable-data printing document template, the program adapted to carry out the steps of:

receiving user definitions defining a layout of document portions, at least one set of the document portions comprising a flow that contains content which is variable in response to input data, the flow spanning across the set of document portions, and further comprising a plurality of document versions, different document versions comprising different combinations of document portions of the set;

generating a computer readable variable data printing document template in response to the user definitions, wherein the continuity of the flow is maintained when a version is selected in response to input selection data.

According to a yet further aspect of the invention, there is provided a method of method of printing a document, the method comprising:

receiving a variable-data printing document template in a computer readable format defining a document to contain variable content in response to input data, template comprising a layout of document portions, at least one set of the document portions comprising a flow that contains content which is variable in response to input data, the flow spanning across the set of document portions;

generating a document for printing by providing input data to the template which defines the document content, wherein the continuity of the flow is maintained when a version is selected in response to input selection data; and     printing the document.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

While the present invention is susceptible of embodiment in various forms, there are described and shown in the drawings presently preferred embodiments. These embodiments are provided so that this disclosure will be thorough and complete, and will fully convey the scope of the invention to those skilled in the art. Like reference numerals refer to like elements throughout.

Examples of the invention provide a method, system and a computer program product for generating and printing a document, the document comprising a variable-data printing document template which defines a document containing variable content in response to input data. The invention enables production of variable-data publishing (VDP) material for Digital Publishing (DP) that rely upon complex document design containing sections of variable content that span across multiple document sections. Such sections of variable content are hereby referred to as flows.

This enables the use of linked copy-hole chains within variable data printing, to automate the adjustment of flows spanning across multiple copy-holes, outside of the design environment and preserving their continuity.

Flow across copy-holes can then be provided even in the situation where some of the pages, and/or copy-holes became optional.

Figure 1:
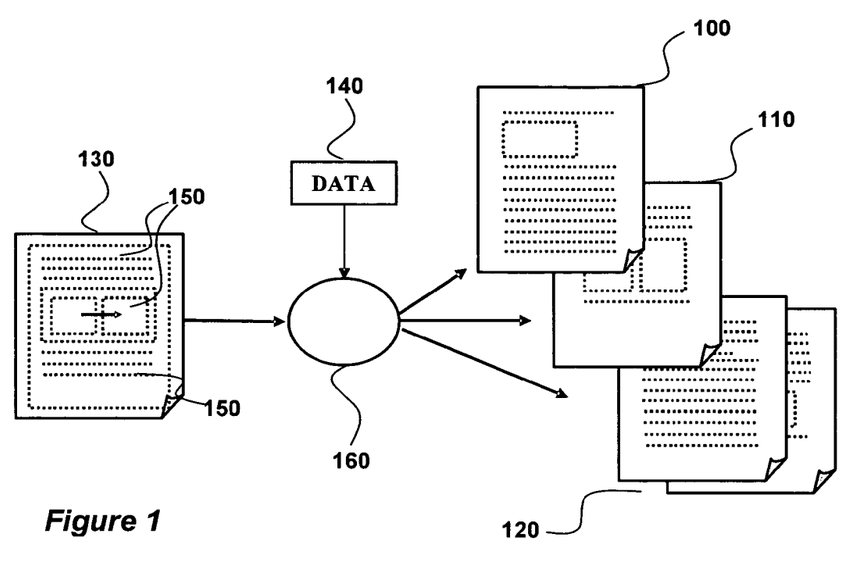
FIG. 1 shows the process of generating documents for printing, the document comprising a template which defines a document containing variable content in response to input data.

Referring to FIG. 1, the process of generating documents 100,110,120 for printing from a document template 130 which defines a document containing variable content in response to input data 140 is shown. The document template 130 comprises a layout of document portions 150 containing content which is variable in response to the input data 140.

The document template 130 is passed to a processor 160 to be merged with input data 140. The input data 140 may be a form of collated data such as, purely by way of an example, a table, a database or a spreadsheet, which defines content to be merged into the document portions 150 of the document template 130 by the processor 160. The processor 160 merges data 140 with the document template 130 and renders the result to produce a document 100 comprising content in response to the data 140. The document can then be rasterised for printing on a printer or digital press.

The input data can be represented using Extensible Markup Language (XML). Since XML is a cross-platform, software and hardware independent tool for transmitting information, data represented as XML can be exchanged between incompatible systems. Accordingly, the use of XML can greatly reduce the complexity of exchanging the data 140.

From a single document template 130, the processor 160 is able to merge the input data 140 to create a plurality of documents 100,110,120 which all contain unique layouts and content.

Figure 2:
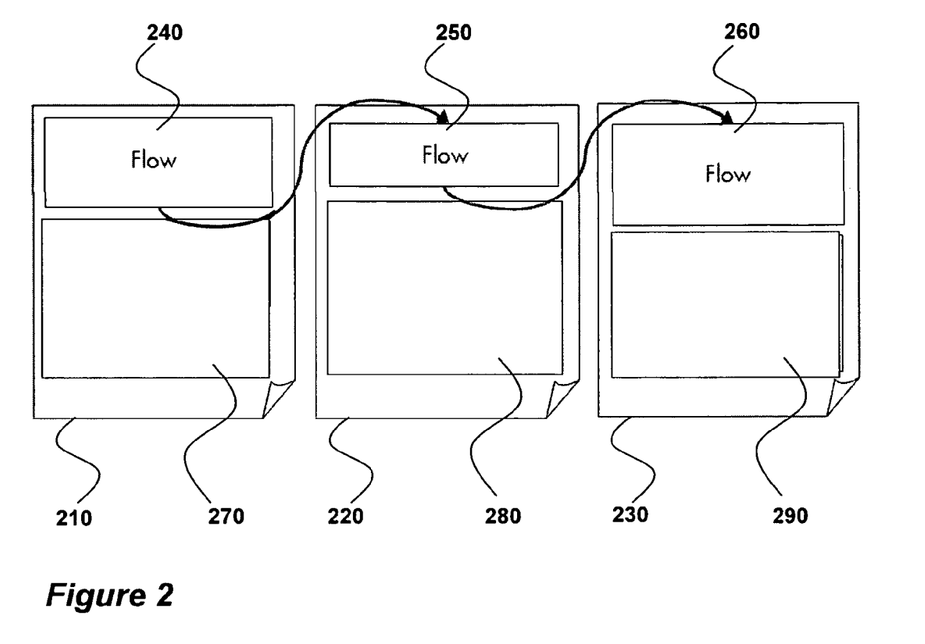
FIG. 2 shows the concept of a document template comprising three pages and linked copy holes, wherein a flow spans across the linked copy holes.

Referring to FIG. 2, a document template comprising three pages 210,220,230 and linked copy holes 240,250,260, wherein a flow spans across the linked copy holes 240,250, 260, is shown. The first page 210 comprises a copy hole 240 and fixed content 270. The second page 220 comprises a copy hole 250 and fixed content 280. The third page 230 comprises a copy hole 260 and fixed content 290. Purely by way of an example, the second page 220 may or may not be present, according to customization preferences. If the second page 220 is chosen not to be present, the second copy-hole 250 and fixed content 280 will not exist in the final document, and the flow must be modified accordingly so that its layout and/or continuity is preserved across the remaining linked copy-holes 240,260.

The invention introduces a new concept of document variant that can be used to enhance the current RTTM PPML/T format by including support for flows that spans across copy-holes. This provides the possibility of realizing a document template in a computer readable format, the template defining complex interactions between multiple copy-holes while maintaining the continuity of the flow.

Accordingly, the production of variable-data publishing (VDP) documents for Digital Publishing (DP) that rely upon complex document designs is enhanced. Such spanning flows make the document template very flexible.

Figure 3:
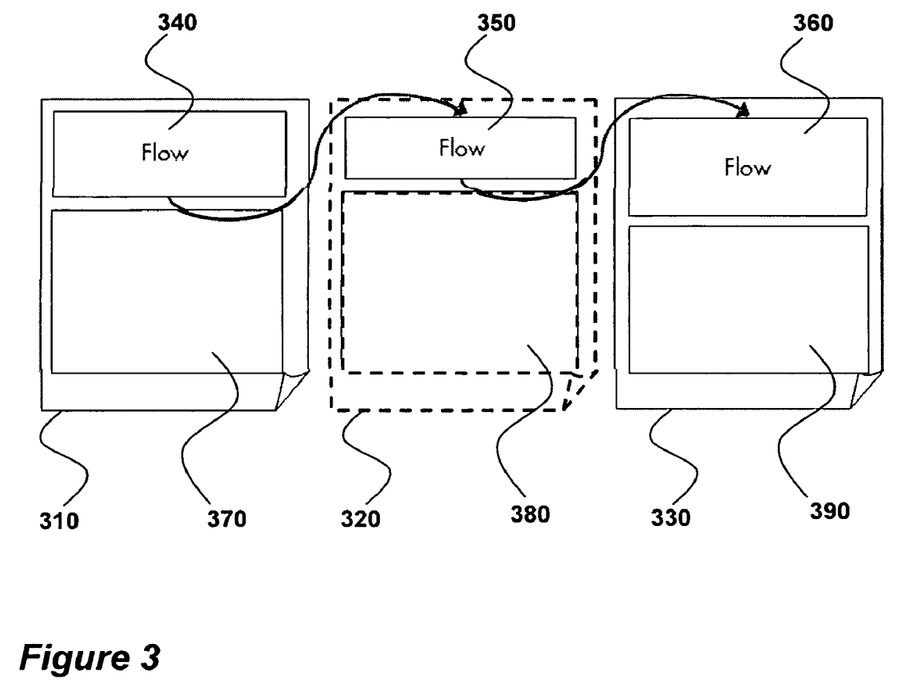
FIG. 3 shows the concept of a document template comprising three pages and linked copy holes, wherein a flow spans across the linked copy holes the and the second page is optional according to predetermined rules.

Referring to FIG. 3, a document template is shown comprising three pages 310,320,330 and linked copy holes 340, 350,360, wherein a flow spans across the linked copy holes 340,350,360 and the second page 320 is optional according to predetermined rules. The first page 310 comprises a copy hole 340 and fixed content 370. The second page 320 comprises a copy hole 350 and fixed content 380. The third page 330 comprises a copy hole 360 and fixed content 390.

For example, the XSL-FO document representation stored inside the first copy-hole 340 of the linked copy-holes 340, 350,360 may be expressed as follows:

```
<fo:root xmlns:fox="fox">
  <fo:layout-master-set>
    <fo:simple-page-master master-name="spm01" page-height=".."
    page-width="..">
      <fo:region-body/>
    </fo:simple-page-master>
    <fo:simple-page-master master-name="spm02" page-height=".."
    page-width="..">
      <fo:region-body/>
    </fo:simple-page-master>
    <fo:simple-page-master master-name="spm03" page-height=".."
    page-width="..">
      <fo:region-body/>
    </fo:simple-page-master>
    <fo:page-sequence-master master-name="spms01">
      <fo:single-page-master-reference master-reference="spm01"/>
      <fo:single-page-master-reference master-reference="spm02"/>
      <fo:single-page-master-reference master-reference="spm03"/>
    </fo:page-sequence-master>
  </fo:layout-master-set>
  <fo:page-sequence master-reference="spms01">
    <fo:flow flow-name="Flow">
      <fo:block font-family="Futura Bk" font-size="18pt"
      hyphenation="true">
      ...
      </fo:flow>
  </fo:page-sequence>
</fo:root>
```

This code is simply representing the document by defining its attributes within the tags of the code. In the above example, the copy-holes are represented as pages and the page sequence represents the flow sequence in the various copy-holes. The first page 310 is defined as a simple-page-master (SPM) formatting-object (FO) with the name "spm01", the second page 320 is defined as a SPM FO with the name "spm02", and the third page 330 is defined as a SPM FO with the name "spm03". The page sequence master (PSM) is defined as an FO with the name "spms01" and a flow-sequence of first page (spm01), second page (spm02), and third page (spm03).

The program code uses standard SVG tags as defined by the World Wide Web Consortium (W3C). These will be well known to those skilled in the art and accordingly are not described in detail.

In the case of the second page 320 being optional and within the middle of a flow between copy-holes, the sequence needs to be modified accordingly when the second page 320 does not exist due to the application of predetermined rules.

To allow the Graphic Artist (GA) to design complex interactions between multiple copy-holes while maintaining the layout and/or continuity of the flow, the invention uses the concept of themes to deal with the existence or non-existence of pages and copy-holes. For example, a dynamic theme can enable copy-holes to appear and disappear based upon rules and applied data. The GA may represent the optional existence of the second page using a rule at design time, the rule being a representation of a Theme with the existence option.

For example, the selection between the existence and non-existence of the second page 320 may be implemented using a <xsl:choose> construct expressed as follows:

```
<xsl:choose>
  <xsl:when test="(Condition = 'True')">
```

-continued

```
<ppml:PAGE id="02">
...
</ppml:PAGE>
</xsl:when>
</xsl:choose>
```

The above example defines a page with an identity of "02" when a predetermined condition is satisfied. The <xsl:when> test is therefore used to establish whether the page should be included or not. If the condition is not satisfied, the page is simply not defined. Thus, the <xsl:choose> construct simply selects different theme options in response to external data.

The program code uses standard XSL tags as defined by the World Wide Web Consortium (W3C). These will be known to those skilled in the art and accordingly are not described in detail.

To have a similar effect on a flow with an optional page or copy-hole, it is required to extend the concept of theme options to the sequence within the XSL-FO representing the flow. For example, the non-existence option of the second page 320 can be expressed within the previous XSL-FO document representation as follows:

```
<fo:root xmlns:fox="fox">
  <fo:layout-master-set>
    <fo:simple-page-master master-name="spm01" page-height=".."
    page-width="..">
      <fo:region-body/>
    </fo:simple-page-master>
    <fo:simple-page-master master-name="spm02" page-height=".."
    page-width="..">
      <fo:region-body/>
    </fo:simple-page-master>
    <fo:simple-page-master master-name="spm03" page-height=".."
    page-width="..">
      <fo:region-body/>
    </fo:simple-page-master>
    <fo:page-sequence-master master-name="spms01">
      <fo:single-page-master-reference master-reference="spm01"/>
      <xsl:choose>
        <xsl:when test="(Condition = 'True')">
          <fo:single-page-master-reference master-reference="spm02"/>
        </xsl:when>
      </xsl:choose>
      <fo:single-page-master-reference master-reference="spm03"/>
    </fo:page-sequence-master>
  </fo:layout-master-set>
  <fo:page-sequence master-reference="spms01">
    <fo:flow flow-name="Flow">
      <fo:block font-family="Arial" font-size="18pt"
      hyphenation="true">
        ...
      </fo:block>
    </fo:flow>
  </fo:page-sequence>
</fo:root>
```

The above code defines that the second page 320, named "spm2", is included within the page sequence when a predetermined condition is satisfied. If the condition is not satisfied, the page is simply not included. This implementation of the conditional test within the XSL-FO page-sequence-master automatically maps the flow to the first and third pages 310,330 instead of all three pages 310,320,330.

Leveraging the concepts of themes and flow across copyholes by using a combination of PPML and XSL-FO, it is possible to map the flow across multiple pages in a fully automatic and reliable way. Thus, the mapping is automated outside of the authoring environment at post-design time and/or at printing time.

Another embodiment of the invention takes account of a special case where an optional page is the page that contains the first of the linked copy-holes.

Figure 4:
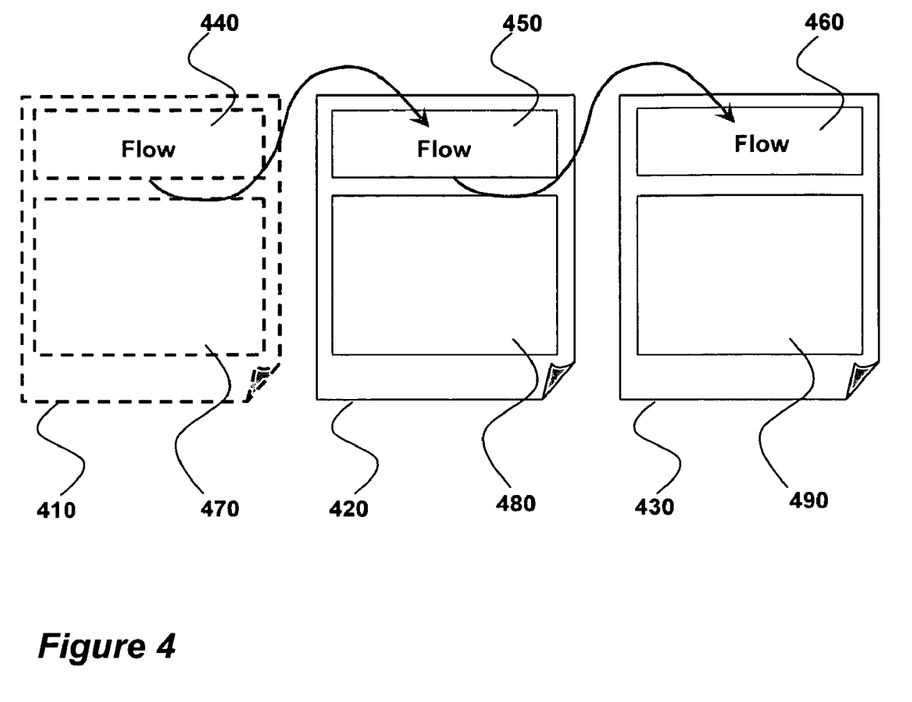
FIG. 4 shows the concept of a document template comprising three pages and linked copy holes, wherein a flow spans across the linked copy holes the and the first page, which contains the first of the linked copy-holes, is optional according to predetermined rules.

Referring to FIG. 4, a document template is shown comprising three pages 410,320,330 and linked copy holes 440, 450,460, wherein a flow spans across the linked copy holes 440,450,460 and the first page 410 (containing the first of the linked copy-holes 440,450,460) is optional according to predetermined rules is shown. The first page 410 comprises a copy hole 440 and fixed content 470. The second page 420 comprises a copy hole 450 and fixed content 480. The third page 430 comprises a copy hole 460 and fixed content 490.

To account for this special case, where the first page 410 containing the first of the linked copy-holes 440,450,460 is optional, the flow content is included in both the first and second pages 410,420 of the page sequence. However, the flow content within the second page 420 has a revised page sequence which reflects the necessary changes due to the absence of the first page 410 from the document template.

Adopting a similar approach to that described previously, the non-existence option of the first page 410 can therefore be expressed within the XSL-FO document representation as follows:

```
<xsl:choose>
  <xsl:when test="(Condition = 'True')">
    <ppml:PAGE id="01">
      ...
      <ppml:MARK Position="...">
      ...
      <ppml:INTERNAL_DATA>
        <fo:root xmlns:fox="fox">
          <fo:layout-master-set>
            <fo:simple-page-master master-name="spm01"
            page-height=".." page-width="..">
              <fo:region-body/>
            </fo:simple-page-master>
            <fo:simple-page-master master-name="spm02"
            page-height=".." page-width="..">
              <fo:region-body/>
            </fo:simple-page-master>
            <fo:simple-page-master master-name="spm03"
            page-height=".." page-width="..">
              <fo:region-body/>
            </fo:simple-page-master>
            <fo:page-sequence-master master-name="spms01">
              <fo:single-page-master-reference master-reference="spm01"/>
              <fo:single-page-master-reference master-reference="spm02"/>
              <fo:single-page-master-reference master-reference="spm03"/>
            </fo:page-sequence-master>
          ...
      </pml:INTERNAL_DATA>
      <ppml:MARK>
    <ppml:PAGE>
  </xsl:when>
</xsl:choose>
```

The above code defines that the first page 410, with an identity of "01", is included when a predetermined condition is satisfied. If the condition is not satisfied, the page is simply not included. Continuing the approach, the copy-hole flow content for the following linked copy-hole of the second page 420 can then be expressed within the XSL-FO document representation as follows:

```
<ppml:PAGE id="02">
...
<ppml:MARK Position="...">
...
```

-continued

```
<ppml:INTERNAL_DATA>
  <xsl:choose>
    <xsl:when test="(Condition = 'False')">
      <fo:root xmlms:fox="fox">
        <fo:layout-master-set>
          <fo:simple-page-master master-name="spm01"
page-height=".." page-width="..">
            <fo:region-body/>
          </fo:simple-page-master>
          <fo:simple-page-master master-name="spm02"
page-height=".." page-width="..">
            <fo:region-body/>
          </fo:simple-page-master>
          <fo:simple-page-master master-name="spm03"
page-height=".." page-width="..">
            <fo:region-body/>
          </fo:simple-page-master>
          <fo:page-sequence-master master-name="spms01">
            <fo:single-page-master-reference master-reference="spm02"/>
            <fo:single-page-master-reference master-reference="spm03"/>
          </fo:page-sequence-master>
    </xsl:when>
  </xsl:choose>
</pml:INTERNAL_DATA>
<ppml:MARK>
<ppml:PAGE>
```

The above code takes account of the non-existence option of the first page 410 by implementing a test for the negative of the predetermined condition and, if the conditional test is satisfied, defines the flow content with a revised page sequence. The conditional test is satisfied when the first page 410 is non-existent (Condition='False') and page sequence is defined such that it does not include the first page 410, named "spm01". If the first page 410 does exist, the conditional test is not satisfied and the definition of the copy-hole flow content for the linked copy-hole of the second page 420 is disregarded.

Further, the above approach can be easily scaled if the number of optional pages at the beginning is greater than one.

Thus, it is to be appreciated that embodiments of the invention provide a method for generating a variable-data printing document template in a computer readable format, the template defining multiple document versions, with each document version being selectable in response to input selection data. In addition, alternative embodiments provide a method of generating a document for printing, the document comprising one version of a variable-data printing document template.

Figure 5:
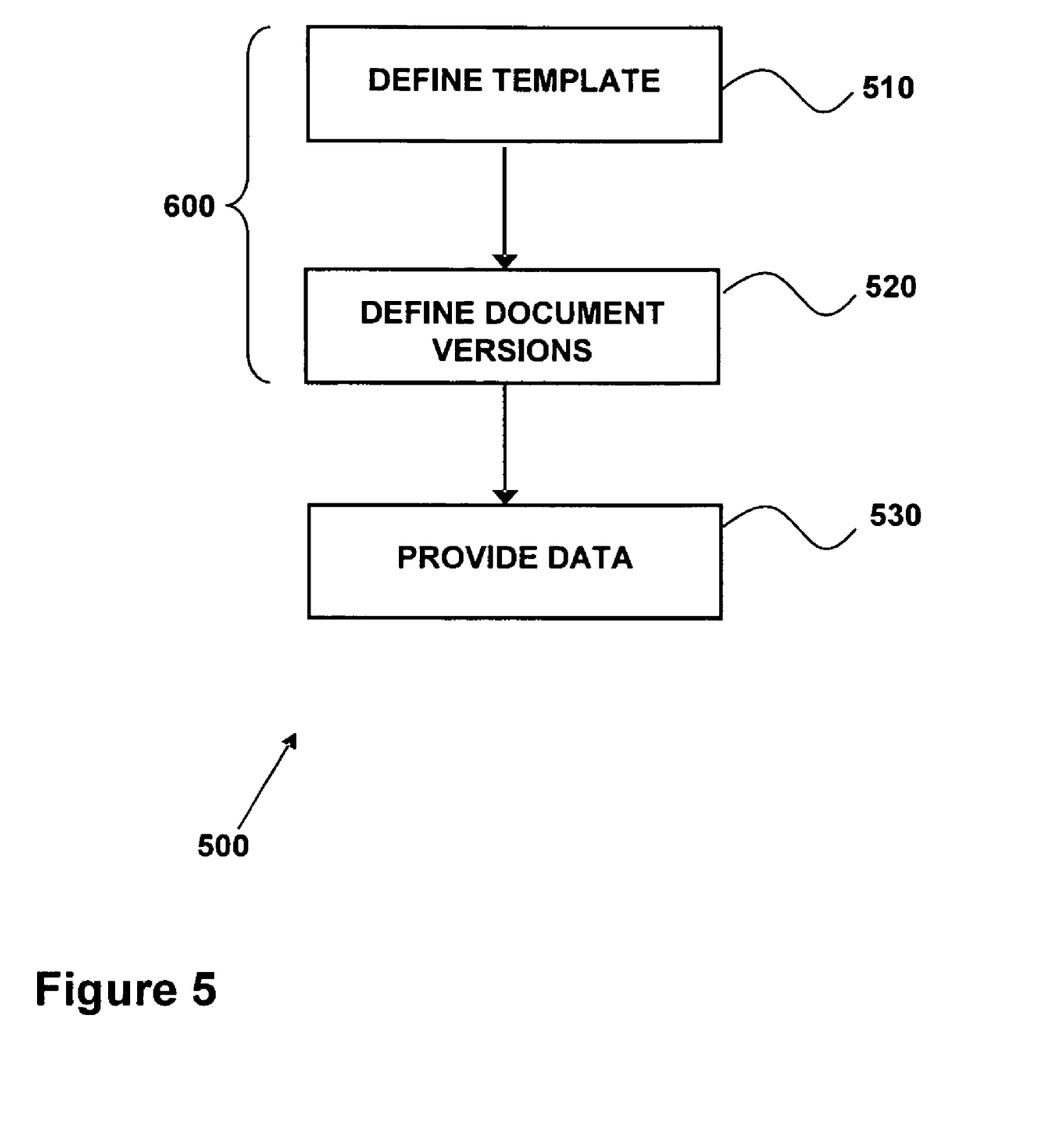
FIG. 5 is a flow diagram illustrating a method of generating a document for printing according to an embodiment of the invention.

Referring now to FIG. 5, a flow diagram is shown that illustrates a method of generating a document for printing according to an embodiment of the invention. The document comprises one version of a variable-data printing document template which defines multiple document versions, each document version being selectable in response to input selection data. The method is indicated generally by arrow 500 and comprises method steps 510 to 530.

Step 510 comprises defining a template comprising a layout of document portions, at least one set of the document portions comprising a flow that contains content which is variable in response to input data, the flow spanning across the set of document portions.

In step 520, a plurality of document versions are defined and the desired variable content of the flow is indicated. Each document version defined comprises different combinations of document portions of the set.

In step 530, a document for printing is generated by providing input selection data to the document template, wherein the continuity of the flow is maintained when a version is selected in response to input selection data.

It may also be appreciated that a method for generating a variable-data printing document template, indicated generally by 600, is provided by steps 510 and 520 of FIG. 5. In response to the input selection data which defines the document version, a document may therefore be generated from a template provided by method 500, wherein the continuity of the flow is maintained It thereby follows that embodiments of the invention also provide a method of printing a document. For example, a document for printing may be generated using the method described above (and illustrated in FIG. 5) and then the generated document may be printed using suitable printing means.

The invention can be implemented as a GA tool to represent documents composed by computer based design software such as Quark xPress and Adobe InDesign. Further modification may also enable the invention to be incorporated into existing VDP software and systems.

Those skilled in the art will realize that the above embodiments are purely by way of example and that modification and alterations are numerous and may be made while retaining the teachings of the invention.

I claim:

1. A method of generating a variable-data printing document template in a computer readable format, the method comprising:
defining a template comprising a layout of a series of separate document pages, at least one set of the respective document pages comprising a flow that contains content which is variable in response to input data, the flow including a series of linked copy holes and spanning across the at least one set of document pages;
defining a plurality of versions of a printable document, wherein at least some of the respective different document versions include a different number of respective document pages of the at least one set, and indicating the desired variable content of the flow; and
further defining the template to automatically maintain, in a post-template-authoring environment, a continuity of the flow when any one of the respective versions of the printable document is automatically selected in response to input selection data during a variable data merge at the time of printing, including automatically maintaining the continuity of the flow when the automatic selection of a respective one of the document versions results in an absence of a first document page in the at least one set of document pages, wherein the first document page includes the first copy hole of the linked copy holes.

2. The method of claim 1, comprising:
generating the variable-data printing document template in response to the input selection data based upon rules which define the document version.

3. The method of claim 1, wherein the flow is represented as an Extensible Stylesheet Language Formatting Object (XSL-FO).

4. The method of claim 1, wherein the variable-data printing document template is represented as a Personalized Print Markup Language Template (PPML/T), and wherein the input selection data comprises data represented as Extensible Markup Language (XML).

5. The method of claim 1, wherein the size of a document portion comprising the flow is variable in response to the input selection data which defines the document version.

6. A method of generating a document for printing, the method comprising:
  generating the document template, by:
    defining a variable-data printing template, the template comprising a layout of document pages with at least one set of the document pages comprising a flow that contains content which is variable in response to input data, the flow spanning across the at least one set of document pages, wherein the flow comprises a series of linked copy holes;
    defining a plurality of document versions, wherein in at least some of the different document versions, at least one document page across which the flow spans is absent from the at least one set of document pages, and defining the respective document versions further includes indicating the desired variable content of the flow; and
  generating one of the respective document versions for printing by providing input selection data to the template via variable data merging at the time of printing to automatically select one of the respective document versions, while automatically maintaining continuity of the flow, when a respective one of the at least some document versions is automatically selected in which at least one document page is absent, is performed according to a conditional choose function via:
    in the event that a first page of the at least one set exists in the input data, applying a first page sequence definition that maps the flow to begin at the first page and includes all subsequent pages of the at least one set; and
    in the event that the first page of the at least one set is non-existent in the input data, applying a second page sequence definition that maps the flow to begin at a second page of the at least one set and includes all subsequent pages of the at least one set while omitting the non-existent first page of the at least one set holes, wherein the non-existent first page corresponds to a first copy-hole of the linked copy holes.

7. The method of claim 6, wherein generating the document template comprises:
  defining rules that depict each respective document version in response to the input selection data.

8. The method of claim 6, wherein the flow is represented as an Extensible Stylesheet Language Formatting Object (XSL-FO), wherein the variable-data printing document template is represented as a Personalized Print Markup Language Template (PPML/T), and wherein the input selection comprises data represented as Extensible Markup Language (XML).

9. A system for generating a variable-data printing document template, the system comprising:
  a processor which is adapted to:
    receive from a user a variable-data printing document template definition, the template definition comprising a layout of document pages with at least one set of the document pages including a flow that contains content which is variable in response to the input data, the flow spanning across the at least one set of document pages;
    receive from a user a plurality of document versions, wherein at least some of the different document versions comprise a different series of the respective document pages of the at least one set of document pages, and indicate the desired variable content of the flow,
    wherein the template definition is configured to automatically maintain the continuity of the flow when any one of the respective document versions is automatically selected in response to input selection data during variable data merging, wherein automatically maintaining the continuity of the flow, when the automatic selection of a respective one of the document versions results in an absence of a document page of the at least one set of document pages across which the flow spans, is performed via a conditional choose function such that:
      in the event that all pages of the at least one set exists in the input data, applying a first page sequence definition that maps the flow to span across all pages of the at least one set; and
      in the event that an intermediate page of the at least one set is non-existent in the input data, applying a second page sequence definition that remaps the flow to begin with a first page, include all pages of the at least one set prior to the intermediate page, and include all pages of the at least one set subsequent to the intermediate page.

10. The system of claim 9, further comprising a printer, which is adapted to receive input selection data which defines a respective one of the document versions, and generate the respective defined document version from the input selection data and the document template.

11. A non-transitory, computer program product for performing a method of generating a computer readable variable-data printing document template, the method comprising:
  receiving user definitions defining a layout of document pages, at least one set of the document pages comprising a flow that contains content which is variable in response to input data during variable data printing, the flow spanning across the at least one set of document pages, and wherein the user definitions further comprise a plurality of document versions, wherein each different document version comprises a different combination of the respective document portions of the at least one set; and
  generating a computer readable variable data printing document template in response to the user definitions, wherein the continuity of the flow is automatically maintained when any one of the document versions is automatically selected in response to input selection data during variable data printing, including:
    automatically maintaining the continuity of the flow, even with a non-existence of a document page of the at least one set of document pages across which the flow spans, via operation of a conditional choose function that automatically selects between a first page sequence definition when all page of the at least one set exists in the input data to cause mapping of the flow to span across all pages of the at least one set and a second page sequence definition when an intermediate page of the at least one set is non-existent in the input data to cause remapping of the flow to begin with a first page, include all pages of the at least one set prior to the intermediate page, and include all pages of the at least one set subsequent to the intermediate page.

12. The computer program product of claim 11, wherein the computer readable variable data printing document template is represented as a Personalized Print Markup Language Template (PPML/T).

13. The method of claim 9, wherein the flow is represented as an Extensible Stylesheet Language Formatting Object (XSL-FO) and wherein the input data is represented as Extensible Markup Language (XML).

14. The method of claim 13, wherein the variable data printing document template is represented as a Personalized Print Markup Language Template (PPML/T).

15. A method of generating a document for printing, the method comprising:
 generating the document template, by:
  defining a variable-data printing template, the template comprising a layout of document pages with at least one set of the document pages comprising a flow that contains content which is variable in response to input data, the flow spanning across the at least one set of document pages;
  defining a plurality of document versions, wherein in at least some of the different document versions, at least one document page across which the flow spans is absent from the at least one set of document pages, and defining the respective document versions further includes indicating the desired variable content of the flow; and
 generating one of the respective document versions for printing by providing input selection data to the template via variable data merging at the time of printing to automatically select one of the respective document versions, while automatically maintaining continuity of the flow when a respective one of the at least some document versions is automatically selected in which at least one document page is absent via:
  in the event that all pages of the at least one set exists in the input data, applying a first page sequence definition that maps the flow to span across all pages of the at least one set; and
  in the event that an intermediate page of the at least one set is non-existent in the input data, applying a second page sequence definition that remaps the flow to begin with a first page, include all pages of the at least one set prior to the intermediate page, and include all pages of the at least one set subsequent to the intermediate page,
 wherein the first and second page sequence definitions are expressed as a conditional choose function.

16. The method of claim 15, wherein the conditional choose function is represented as an Extensible Stylesheet Language Formatting Object.

17. The method of claim 15, wherein the conditional choose function sets a condition in which existence of the first page is equated with the condition being true and in which non-existence of the first page is equated with the condition being false.

18. The method of claim 6, wherein the conditional choose function is represented as an Extensible Stylesheet Language Formatting Object.

* * * * *